United States Patent
Sonal et al.

(10) Patent No.: US 12,039,771 B2
(45) Date of Patent: Jul. 16, 2024

(54) METHODS AND APPARATUSES FOR DETECTING A CHANGE IN AN AREA OF INTEREST

(71) Applicant: Telefonaktiebolaget LM Ericsson (publ), Stockholm (SE)

(72) Inventors: Manish Sonal, Sollentuna (SE); José Araújo, Stockholm (SE); Alfredo Fanghella, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 27 days.

(21) Appl. No.: 17/910,187

(22) PCT Filed: Mar. 9, 2020

(86) PCT No.: PCT/EP2020/056149
§ 371 (c)(1),
(2) Date: Sep. 8, 2022

(87) PCT Pub. No.: WO2021/180295
PCT Pub. Date: Sep. 16, 2021

(65) Prior Publication Data
US 2023/0120433 A1 Apr. 20, 2023

(51) Int. Cl.
*G06T 7/62* (2017.01)
*G06T 17/00* (2006.01)
(Continued)

(52) U.S. Cl.
CPC .............. *G06V 10/761* (2022.01); *G06T 7/62* (2017.01); *G06T 17/00* (2013.01); *G06V 10/25* (2022.01);
(Continued)

(58) Field of Classification Search
None
See application file for complete search history.

(56) References Cited

U.S. PATENT DOCUMENTS

| 9,554,762 B2 * | 1/2017 | Kim | A61B 5/0037 |
| 10,789,767 B2 * | 9/2020 | Zhang | G06T 15/205 |

(Continued)

OTHER PUBLICATIONS

International Search Report and Written Opinion issued in International Application No. PCT/EP2020/056149 dated Nov. 30, 2020 (9 pages).

(Continued)

*Primary Examiner* — Saptarshi Mazumder
(74) *Attorney, Agent, or Firm* — Rothwell, Figg, Ernst & Manbeck, P.C.

(57) ABSTRACT

A method for detecting a change in an area of interest. The method includes: 1) forming a pointcloud that comprises: i) a first set of points derived from a first set of one or more images and ii) a second set of points derived from a second set of one or more images; 2) for each point included in the pointcloud, assigning a similarity score to the point; 3) for at least each point from the pointcloud that is included in a particular set of points (e.g., for each point in the pointcloud that is assigned a similarity score that exceeds a threshold (e.g. 0)), determining a value Nt and a value Nnew and adjusting the similarity score assigned to the point based on Nt and Nnew; and 4) using the adjusted similarity scores to determine whether the area of interest has changed.

19 Claims, 8 Drawing Sheets

(51) Int. Cl.
  *G06V 10/25* (2022.01)
  *G06V 10/74* (2022.01)
(52) U.S. Cl.
  CPC .............. *G06T 2207/10028* (2013.01);
              *G06T 2210/56* (2013.01)

(56) References Cited

U.S. PATENT DOCUMENTS

| | | | | |
|---|---|---|---|---|
| 10,872,268 | B2* | 12/2020 | Nishino | G06T 7/246 |
| 11,663,805 | B1* | 5/2023 | Tang | G06V 40/12 |
| | | | | 382/115 |
| 11,781,863 | B2* | 10/2023 | Qu | G06F 18/00 |
| | | | | 382/104 |
| 2016/0379087 | A1* | 12/2016 | Ruepp | G06F 18/22 |
| | | | | 382/201 |
| 2020/0342022 | A1* | 10/2020 | Lo | G06F 16/532 |
| 2024/0029359 | A1* | 1/2024 | Nie | G16H 50/20 |

OTHER PUBLICATIONS

Gunji, N. et al., "3D Object Recognition from large-scale point clouds with global descriptor and sliding window", 2016 23rd International Conference on Pattern Recognition (ICPRR), IEER, Dec. 2016 (6 pages).

Qin, R. et al., "3D change detection—Approaches and applications". ISPRS Journal of Photogrammetry and Remote Sensing, vol. 122, Oct. 2016 (16 pages).

Schonberger, J. et al., "Structure-from-Motion Revisited", ResearchGate, Conference Paper—Jun. 2016 (11 pages).

Ulusoy, A. et al., "Image-based 4-d Reconstruction Using 3-d Change Detection", (eds) Computer Vision—EECV 2014. Lecture Notes in Computer Science, vol. 8691, 2014 (16 pages).

Sakurada, K. et al., "Detecting Changes in 3D Structure of a Scene from Multi-view Images Captured by a Vehicle-mounted Camera", 2013 IEEE Conference on Computer Vision and Pattern Recognition, 2013 (8 pages).

Nister, D. et al., "Scalable Recognition with a Vocabulary Tree", 2006 IEEE Computer Society Conference on Computer Vision and Pattern Recognition (CVPR'06), 2006 (9 pages).

Besl, P. et al., "A Method for Registration of 3-D Shapes", IEEE Transactions on Pattern Analysis and Machine Intelligence, vol. 14, No. 2, Feb. 1992 (18 pages).

Gelfand, N. et al., "Robust Gold Registration", Eurographics Symposium on Geometry Processing (2005) (10 pages).

Straub, J. et al., "Efficient Global Point Cloud Alignment Using Bayesian Nonparametric Mixtures", 2017 IEEE Conference on Computer Vision and Pattern Recognition (CVPR), 2017 (11 pages).

Lowe, D., Distinctive Image Features from Scale-Invariant Keypoints, Computer Science Department, University of British Columbia, Jan. 2004 (28 pages).

* cited by examiner

METHODS AND APPARATUSES FOR DETECTING A CHANGE IN AN AREA OF INTEREST

CROSS REFERENCE TO RELATED APPLICATIONS

This application is a 35 U.S.C. § 371 National Stage of International Patent Application No. PCT/EP2020/056149, filed Mar. 9, 2020.

TECHNICAL FIELD

Disclosed are embodiments related to detecting a change in an area of interest.

BACKGROUND

In certain industries it is advantageous to determine whether an area of interest (AOI) has changed. For instance, it may be advantageous to determine whether new objects were introduced into the AOI since the last time the AOI was scanned. As one example, this could be useful to diagnose problems at base stations: the current state of the area in which the base station is situated could be compared to the previous state of the area, highlighting the differences, which may be the cause of an ongoing problem. A technician, therefore, may scan the area using some kind of sensor that produces images of the area that are then used to produce a digital model of the area, which digital model is then compared to a previous digital model of the area produced as a result of a prior scan of the area to detect changes in the AOI (e.g., detect objects that have been added to the area since the prior scan, objects that have been removed from the area since the prior scan, and/or objects that have changed since the prior scan).

SUMMARY

One particular way to solve this problem is to build a three-dimensional (3D) model (a pointcloud or a polygon mesh) using 3D reconstruction algorithms such as Structure-from-Motion (SfM) (see reference [1]) if using monocular cameras, or creating a 3D model of the world using a depth camera (e.g. Lidar, stereo) for both states, and find the differences using the models. The challenge is then finding differences that are meaningful for the users. Changes in illumination, different cameras, or even just camera locations while scanning can produce different models when the comparison is naive (e.g. comparing each point in two-pointclouds or each pixel in two depth maps for the same camera location). If the possible changes that interests the users are known beforehand, it is possible to use supervised learning techniques to find out what the current state is given the models. An example of this approach is described in reference [2], where sliding window object detectors are trained to find predefined objects in pointclouds. Other methods try to find which areas in the model have changed in a dense manner (pixel-wise on images (see reference [3]) or voxel-wise on 3D models (see reference [4])) while taking into consideration the effects of unimportant changes (e.g. changes in lightning) in order to ignore them when it is appropriate to do so.

Certain challenges presently exist. Methods like the ones described in references [2] and [4] rely on obtaining a highly accurate 3D model of the environment, which in most cases is not possible with the current technology. A pointcloud built using SfM is prone to noise, like lower density of points in describing some objects or holes in the pointcloud. Similar problems also occur when building pointclouds from depth sensors. Moreover, depending on the environmental conditions like lightning, the camera motion, and different view at which images were taken etc, creating two 3D models of the same scene at two different points in time can produce very different 3D models even where the scene has hardly changed. That is, this can result in pointclouds composed of points with different visual features, and the algorithms may, therefore, detect changes in scene even when there is no real change (i.e., the scene change algorithms may produce many false positives).

To overcome these challenges, this disclosure describes improved methods for detecting a change in an area of interest. In one embodiment, the method includes forming a pointcloud that includes: i) a first set of points derived from a first set of one or more images, wherein each image included in the first set of images was obtained during a first period of time, t1, and each image included in the first set of images is an image of at least a portion of the area of interest and ii) a second set of points derived from a second set of one or more images, wherein each image included in the second set of images was obtained during a second period of time, t2, and each image included in the second set of images is an image of at least a portion of the area of interest, wherein each point of the pointcloud is associated with a location within the area of interest, and t1 is different than t2. The method also includes, for each point included in the pointcloud, assigning a similarity score to the point, wherein the similarity score assigned to the point indicates a degree of similarity between the point and points within the first set of points. The method also includes, for at least each point from the pointcloud that is included in a particular set of points, determining a value Nt and a value Nnew, wherein Nt is the total number of points within the pointcloud that are associated with a location that is within a defined geometrical volume in which the location to which said point is associated is also within, and Nnew is the total number of points within the pointcloud that are i) associated with a location that is within the defined geometrical volume and ii) included in second set of points; and adjusting the similarity score assigned to the point based on Nt and Nnew. The method further includes using the adjusted similarity scores to determine whether the area of interest has changed.

In another aspect there is provided a computer program comprising instructions which when executed by processing circuitry causes the processing circuitry to perform the above described method. In one embodiment, there is provided a carrier containing the computer program wherein the carrier is one of an electronic signal, an optical signal, a radio signal, and a computer readable storage medium.

In another aspect there is provided an apparatus for detecting a change in an area of interest. The apparatus is adapted to form a pointcloud. The pointcloud comprises: a first set of points derived from a first set of one or more images, wherein each image included in the first set of images was obtained during a first period of time, t1, and each image included in the first set of images is an image of at least a portion of the area of interest; and a second set of points derived from a second set of one or more images, wherein each image included in the second set of images was obtained during a second period of time, t2, and each image included in the second set of images is an image of at least a portion of the area of interest, wherein each point of the pointcloud is associated with a location within the area of interest, and t1 is different than t2. The apparatus is further adapted such that, for each point included in the pointcloud, the apparatus assigns a similarity score to the point, wherein the similarity score assigned to the point indicates a degree of similarity between the point and points within the first set of points. The apparatus is further adapted to, for at least each point from the pointcloud that is included in a particular set of points, determine a value Nt and a value Nnew, wherein Nt is the total number of points within the pointcloud that are associated with a location that is within a defined geometrical volume in which the location to which said point is associated is also within, and Nnew is the total number of points within the pointcloud that are i) associated with a location that is within the defined geometrical volume and ii) included in second set of points. The apparatus is further adapted to adjust the similarity score assigned to the point based on Nt and Nnew. The apparatus is further adapted to use the adjusted similarity scores to determine whether the area of interest has changed. In one embodiment, the apparatus comprises processing circuitry and a storage unit storing instructions for configuring the apparatus to perform any of the processes disclosed herein.

The embodiments described herein can be applied on top of any 3D scene change detection algorithm to significantly remove false positive proposals. This can act as a post/pre filter stage of a 3D change detection system.

BRIEF DESCRIPTION OF THE DRAWINGS

The accompanying drawings, which are incorporated herein and form part of the specification, illustrate various embodiments.

DETAILED DESCRIPTION

This disclosure describes improved methods for detecting a change in an area of interest.

Figure 1:
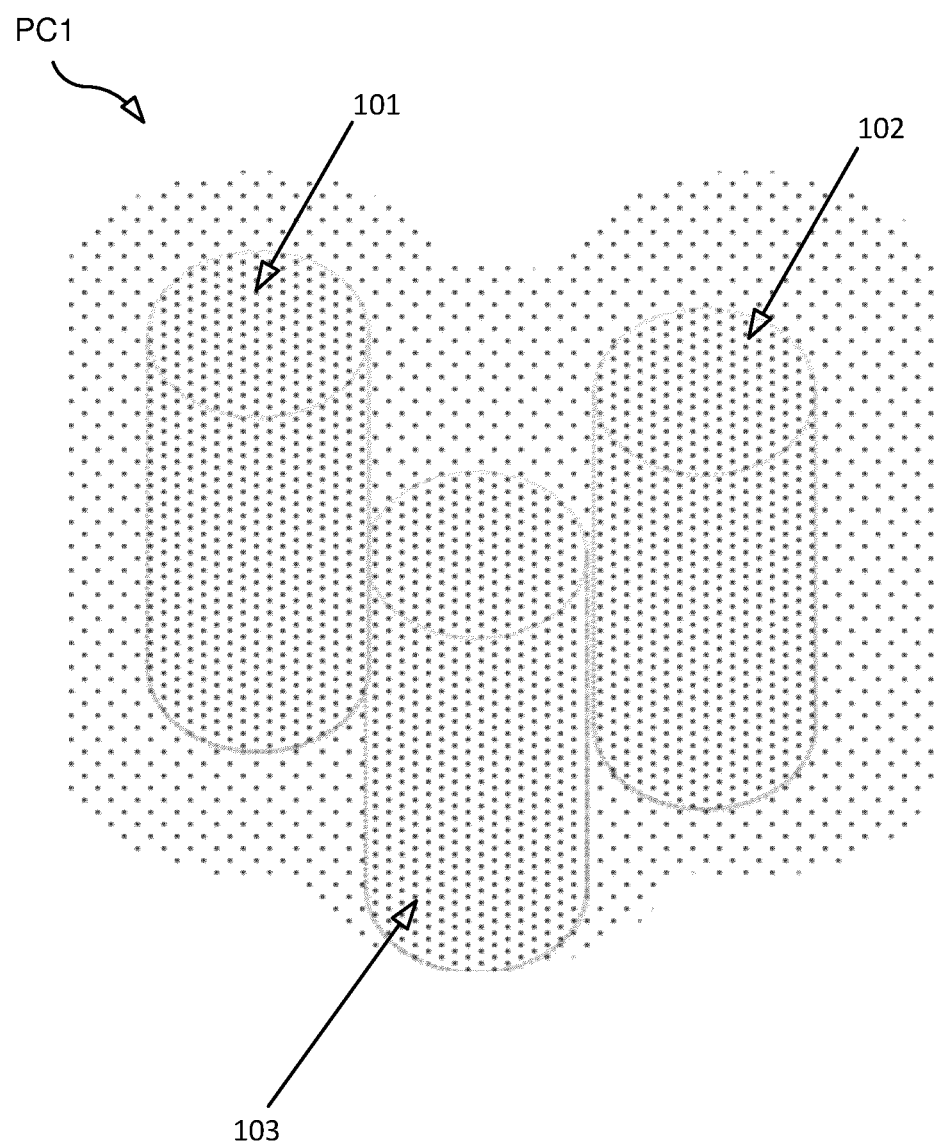
FIG. 1 illustrates a first pointcloud (PC1).
Figure 2:
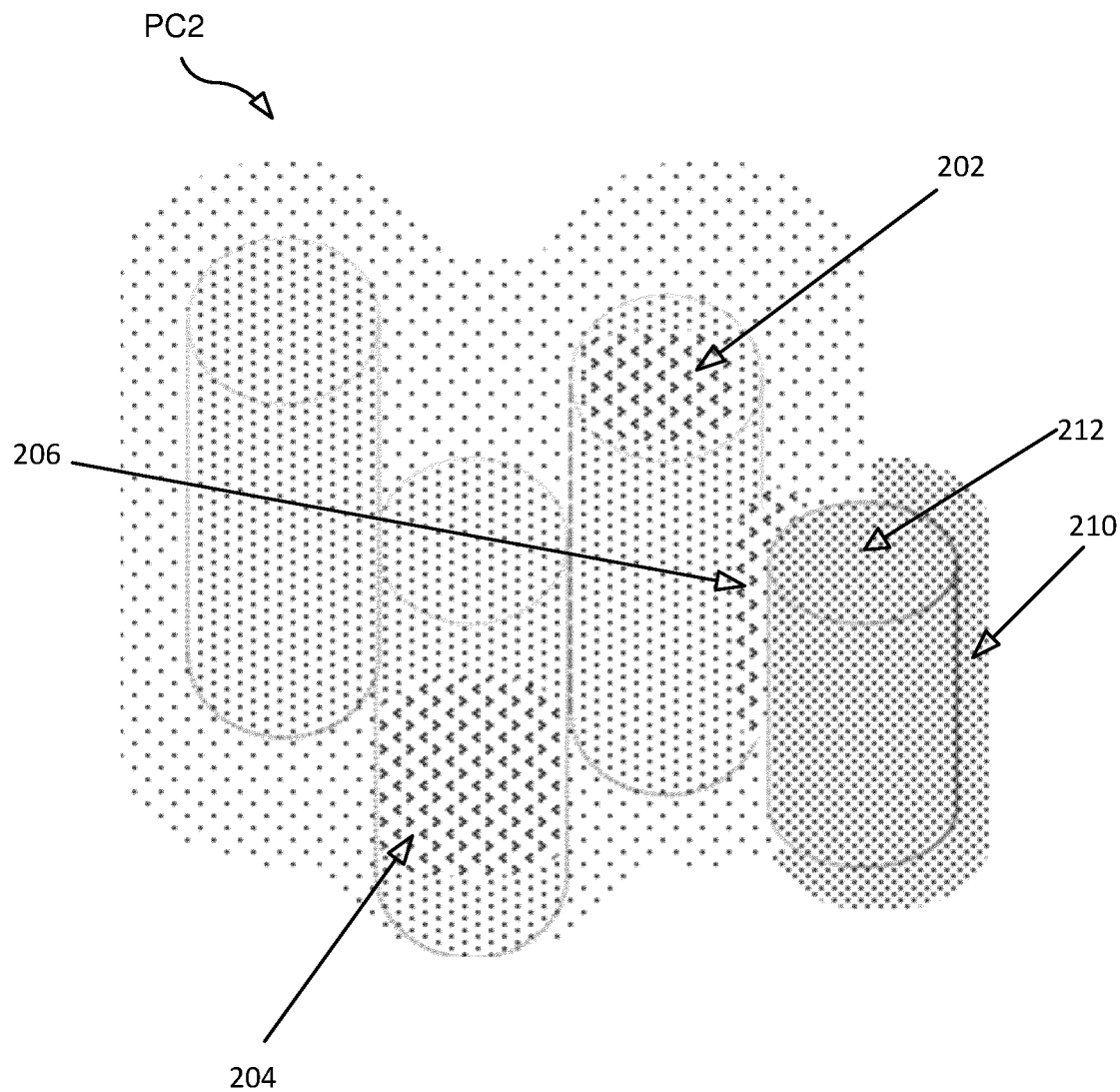
FIG. 2 illustrates a second pointcloud (PC2).

In one embodiment, the method includes obtaining two pointclouds for an area of interest (AOI). A pointcloud may be generated using an algorithm like SFM (see reference [1]) by taking images of the AOI as an input. The first of the two pointclouds (PC1) is built using images taken of the AOI at time t1. The second pointcloud (PC2) is an update of first pointcloud using additional images of the AOI taken at time t2. FIG. 1 illustrate PC1 and FIG. 2 illustrates PC2.

As shown FIG. 1, PC1 includes a group of points that correspond to a first object 101 in the AOI, a group of points that correspond to a second object 102 in the AOI, and a group of points that correspond to a third object 103 in the AOI. As shown in FIG. 2, PC2, includes the group of points that correspond to objects 101, 102, and 103, respectively, as well as additional point groupings 202, 204, 206, and 210. Of these additional point groups, only point group 210 corresponds to a new object 212 that was not previously in the AOI.

In order to detect a change in the AOI, a method similar to the one described in reference [2] can be used. That is, algorithms like SfM calculate and store 2D image feature descriptors which are used during image registration phase. These descriptors can be reused to create visual bag of words (BOW) features using a vocabulary tree as described in references [2] and [5].

Figure 3:
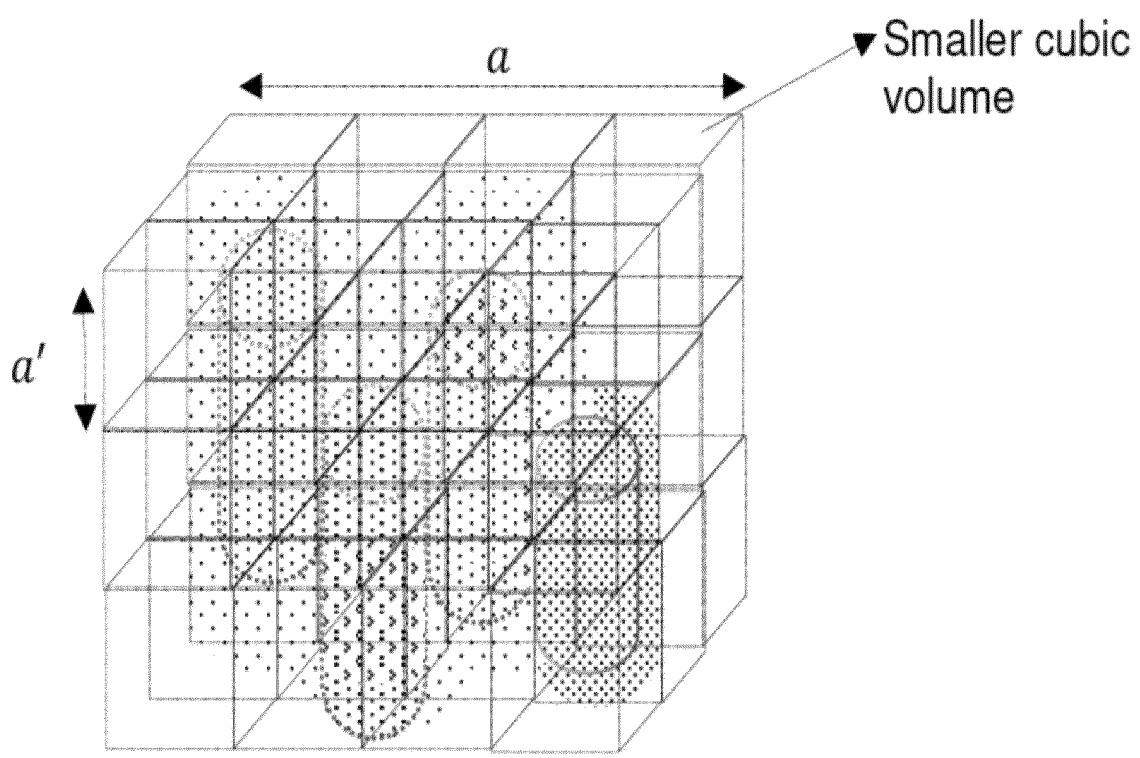
FIG. 3 illustrates PC1 and PC2 fitted inside a cube.

FIG. 3 illustrates PC1 and PC2 fitted inside a cube of side a. This cube is further divided into smaller cubes of side a', each of these smaller cubes will contain a set of 3D points, whose visual appearance is described by corresponding descriptor vectors. One can use these descriptor vector and vocab tree to assign a score (a scalar or a vector) to each of these smaller cubes in space, i.e., a global descriptor, these scores being an indicative of the visual appearance of the cubes.

In one embodiment, the method to determine whether the AOI has changed (e.g., whether a new object has been introduced into the AOI) comprises of following steps: 1) pointcloud alignment; 2) pointcloud comparison using a sliding window; 3) calculating visual difference; 4) assigning visual difference scores to points in 3D space; and 5) removal of false positive and post filtering.

Step 1: Pointcloud Alignment:

The alignment of the pointclouds can be done using multiple methods like iterative closest point (ICP) (see reference [6]) or global pointcloud alignment methods like the methods disclosed in reference [7] or reference [8]. Building 3D model using colmap (reference [1]), one can achieve alignment by registering images taken at time t2 to PC1, which outputs PC2. Thus PC2 will contain 3D points registered from images at times t1 and t2.

Figure 4:
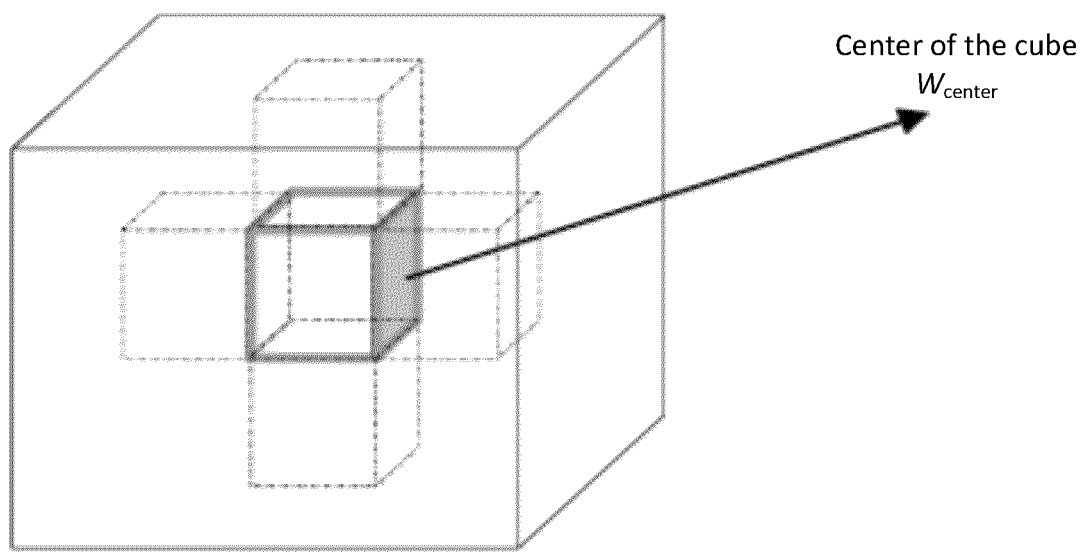
FIG. 4 illustrates a volume in space that is divided into many smaller cubic volumes.

Step 2: Pointcloud Comparison Using a Sliding Window:

A 3D sliding window ($\omega$) (e.g., a cubic volume) can be used to compare the two-pointclouds. This sliding window can be visualized as a volume in space further divided into many smaller cubic volumes as illustrated in FIG. 4. As described in step 1, PC2 contains registered 3D-points from times t1 and t2, thus we slide $\omega$ over PC2 and inside each $\omega$ find out the points contributed by images taken at times t1 and t2.

3D-Points registered at t1, $$\text{points}_{t_1} = \{p_{t_1}^k\}_{k=1}^{r_{t_1}}$$

3D-Points registered at t2, $$\text{points}_{t_2} = \{p_{t_2}^k\}_{k=1}^{r_{t_2}},$$

$r_{t_1}$ and $r_{t_2}$ being any positive integer.

The center volume of the sliding window is denoted $\omega_{center}$ and similarity scores are assigned only to the points inside it. This makes sure that the similarity score assigned to each point in space is based on the visual appearance of 3D points surrounding it.

Step 3: Calculating Visual Difference

Each point in $\text{points}_{t_1}$ and $\text{points}_{t_2}$ is described by a set of descriptors, reference [4] uses SIFT (see reference [9]) and a descriptor of length 128. The custom vocabulary tree is trained on images similar to the scene. Using the set of descriptors describing each of the 3D points and the trained vocabulary tree a global descriptor is calculated using the BOW approach describing points in $\text{points}_{t_1}$ and $\text{points}_{t_2}$, as visual_words$_{t_1}$, visual_words$_{t_2}$. Each component in these feature vectors (visual_words$_{t_1}$, visual_words$_{t_2}$) counts the number of occurrences of a visual word defined in the vocabulary tree.

The distance between visual_words$_{t_1}$ and visual_words$_{t_2}$ describes how similar the region described by points$_{t_1}$ is to the region described by points$_{t_2}$. A larger distance implies a larger difference. We call this distance the similarity score and calculate it as follows:

$$Norm_1 = L1norm(\text{visual}_{words_{t_1}})$$

$$Norm_2 = L1norm(\text{visual}_{words_{t_2}})$$

$$\text{similarity\_score} = L1Norm\left(\frac{\text{visual}_{words_{t_1}}}{Norm_1} - \frac{\text{visual}_{words_{t_2}}}{Norm_2}\right)$$

Notice that similarity_score ranges between 0 (the same words appear in the same relative proportions) and 2 (the two sets of visual words are disjoint).

Since this expression is only defined when the sets of points are not empty ($Norm_1>0$ and $Norm_2>0$) we extend the definition to include the following: if both sets of points are empty ($Norm_1=0$ and $Norm_2=0$), then similarity_score=0; and if only one is empty (($Norm_1=0$ and $Norm_2>0$) or ($Norm_1>0$ and $Norm_2=0$)), then similarity_score=1.

Step 4: Assigning Visual Difference Scores to Points in 3D Space

Figure 5:
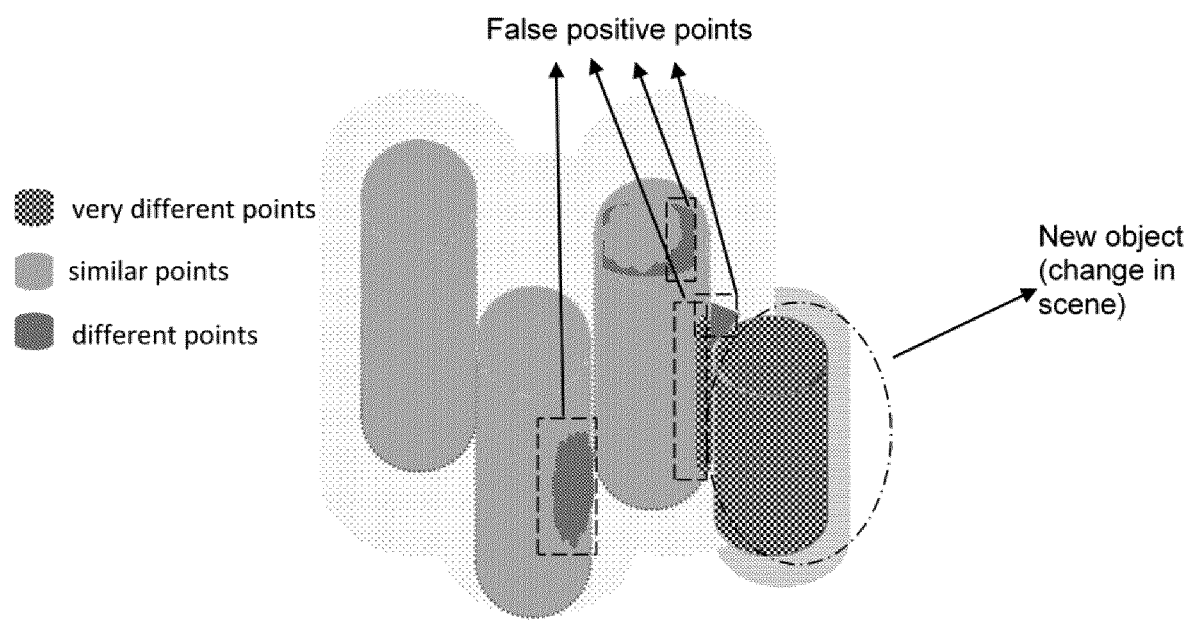
FIG. 5 illustrates similarity scores being assigned to points in a pointcloud.

The similarity score is assigned to the points inside the $\omega_{center}$ in PC2. The 3D sliding volume is moved by delta ($\Delta_x$, $\Delta_y$, $\Delta_z$), and steps 1-4 are repeated until the whole 3D pointcloud is traversed. As a result, similarity scores are assigned to each 3D point in PC2, as shown in FIG. 5, which describes how similar the point is to the points in the same 3D space in PC1. Referring to FIG. 5, the different fill pattern shows how different are the points visually compared to the model built at time t1.

Figure 6:
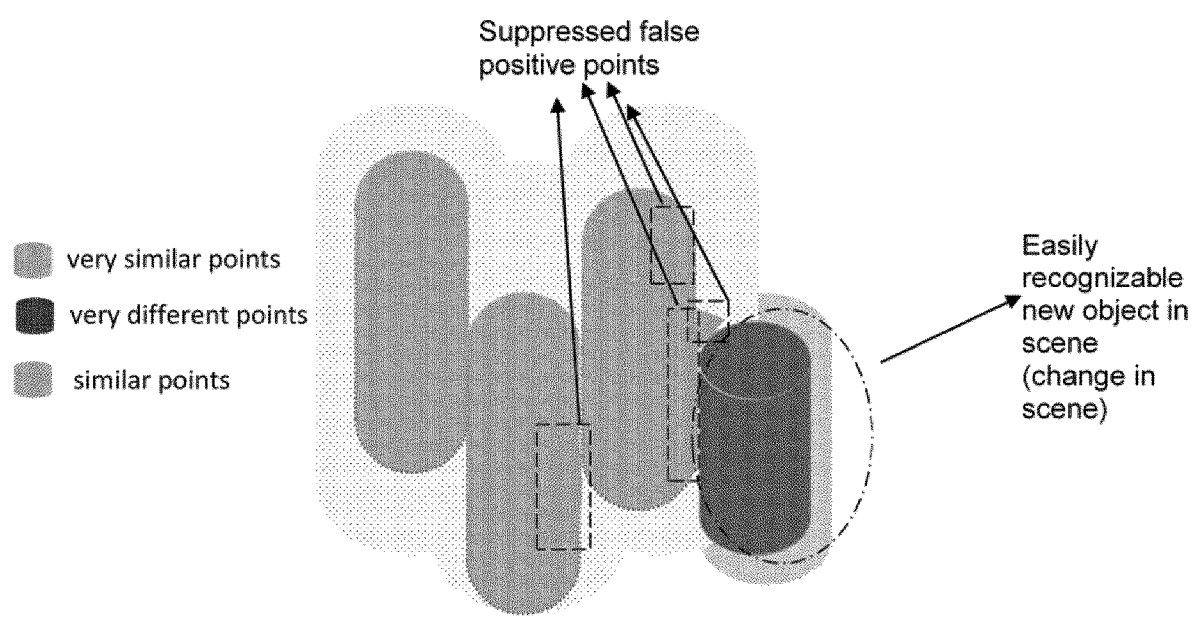
FIG. 6 illustrates the removal of false positives.

Step 5: Removal of False Positive and Post Filtering:

A first 3D model of an AOI created based on images obtained during a first time period (t1) can have a different visual appearance and density of registered points than a second 3D model of the AOI created based on images obtained during a subsequent period of time (t2). This may be caused by changes in lightning conditions and also the views at which the images are taken at times t1 and t2. Consequently, the above algorithm stated in steps1-4, might end up assigning higher similarity score (more difference) to points from objects which have not changed at all (see FIG. 5), i.e. false positive points. That is, FIG. 5 illustrates the points that have been assigned a high similarity score and further illustrates which of these high similarity points would produce a false positive under the above algorithm and which are due to a real change in the scene (in this case, the new cylindrical object). The change detection algorithm is improved by suppressing false positives. That is, the points with a high similarity score that would otherwise produce a false positive under the above algorithm are ignored by the change detection processes of this disclosure. This feature is illustrated in FIG. 6, which shows that, except for the points corresponding to the new cylindrical object, the other points assigned a high similarity score are suppressed (i.e., ignored).

After step 4 there is a pointcloud (PC2) with each point having a similarity score which describes its visual similarity to points in PC1. In order to remove the possible false positive, the similarity scores are adjusted and all the points with an adjusted similarity score higher than a threshold Ø are examined to determine whether the AOI has changed. The threshold (Ø) value indicates how different is the point visually to points in PC1.

Adjusting the Similarity Scores

1. For every point p with similarity_score>0, the other points that are within a volume that includes point p (e.g., a spherical volume of radius r where point p is located at the center of the volume) are categorized as either "new" or "old." For example, every point that is contributed by the newly registered images (i.e., the images obtained during t2) is categorized as "new," otherwise the point is categorized as "old." The total number of "new" points (Nnew) is determined and the total number of "old" points (Nold) is determined.

2. Calculate the proportion of new points lying inside the volume as: P=Nnew/Nt, where Nt=Nnew+Nold.

3. If point p is from the old point cloud then we update its similarity score by adjusting it by a certain factor: a1 or a2, where a1>0, a2<1, and a1>a2. The idea is, if the point p is surrounded by many new points (e.g., P>0.5), the probability of changes around this point is high, so we adjust the similarity score for this point p slightly using factor a1, on the other hand if P<0.5 then p's similarity score is penalized, i.e. adjusted using factor a2, which is less than a1. In one embodiment, a1=0.8 and a2=0.4. For instance, if point p is an old point and P is greater than or equal to 0.5, then the adjusted similarity score for point p is calculated as adjusted_similarity_score=similarity_score*a1, otherwise adjusted_similarity_score=similarity_score*a2.

4. If point p is from the new point cloud then we update its similarity score by adjusting it by a certain factor: b1 or b2, where b1 is greater than 1 and b2 is a positive number less than 1. More specifically, if for this new point p, P is greater than or equal to 0.5, then the similarity score for point p is increased by factor b1 (e.g., the adjusted similarity score for point p is calculated as: adjusted_similarity_score=similarity_score*b1), otherwise the similarity score for point p is decreased by factor b2 (e.g., the adjusted similarity score for point p is calculated as: adjusted_similarity_score=similarity_score*b2). In one embodiment, b1=1.25 and b2=0.9.

With the above algorithm, all the points which are contributed by the newly registered images but from the new object in the scene will get uplift in score while the new points registered around old existing objects will be penalized. Thus, the number of false positive is greatly removed (see FIG. 6, which illustrates the removal of the false positives). To determine whether an object has been removed from the AOI, this can be done by running the algorithm in reverse order.

Figure 7:
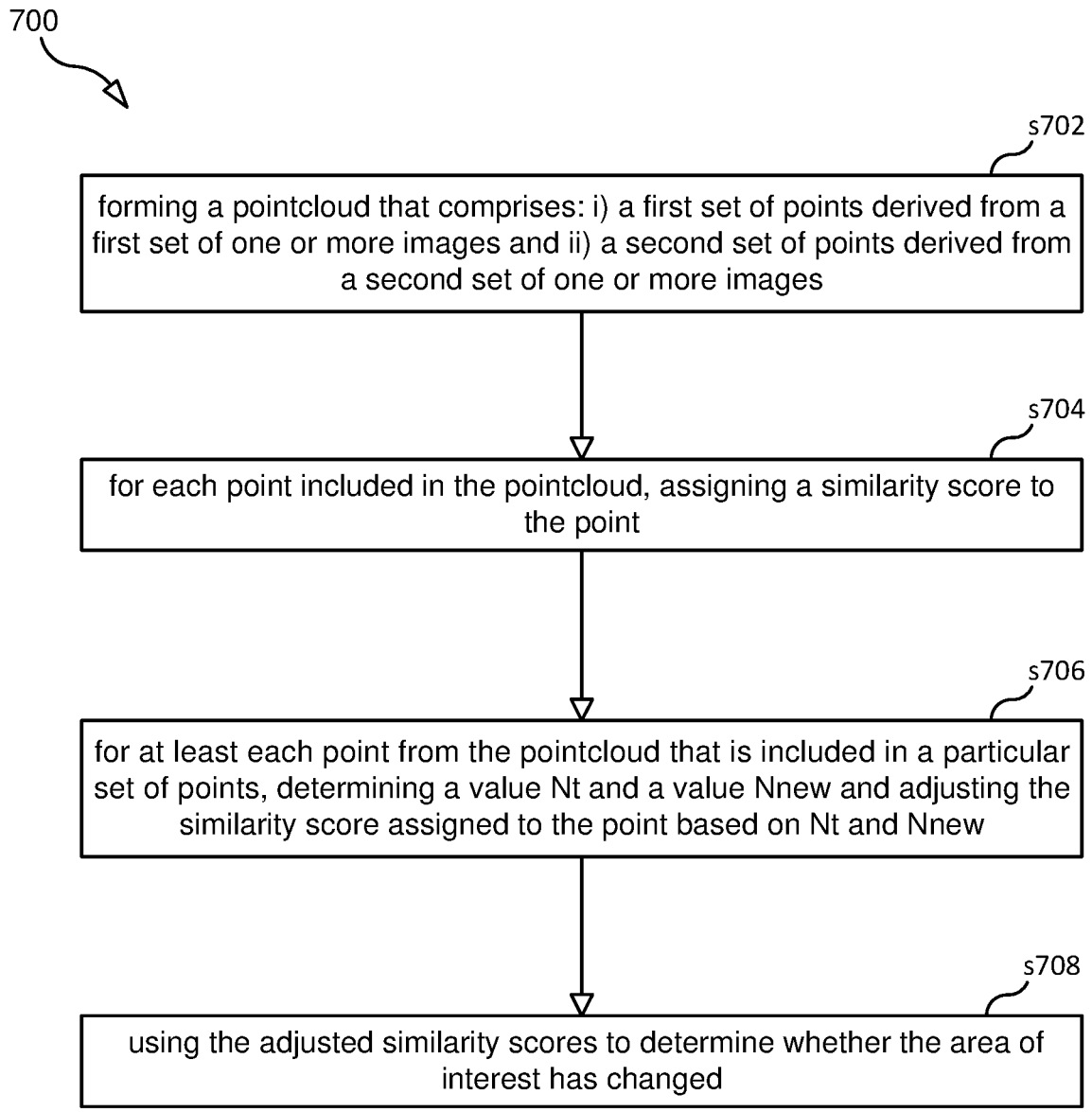
FIG. 7 is a flow chart illustrating a process according to some embodiments.

FIG. 7 is a flow chart illustrating a process 700, according to an embodiment, for detecting a change in an AOI. Process 700 may begin in step 702.

Step s702 comprises forming a pointcloud. The pointcloud comprises: i) a first set of points derived from a first set of one or more images, wherein each image included in the first set of images was obtained during a first period of time, t1, and each image included in the first set of images is an image of at least a portion of the area of interest; and ii) a second set of points derived from a second set of one or more images, wherein each image included in the second set of images was obtained during a second period of time, t2, and each image included in the second set of images is an image of at least a portion of the area of interest, wherein each point of the pointcloud is associated with a location within the area of interest, and t1 is different than t2. In some embodiments, t2 is after t1, and in other embodiments t2 precedes t1.

Step s704 comprises, for each point included in the pointcloud, assigning a similarity score to the point, wherein the similarity score assigned to the point indicates a degree of similarity between the point and points within the first set of points.

For each point in the pointcloud that is included in a particular set of points (e.g., for each point of the pountcloud that is assigned a similarity score that exceeds a threshold (e.g. 0)), step s706 is performed.

Step s706 comprises determining a value Nt and a value Nnew and adjusting the similarity score assigned to the point based on Nt and Nnew. Nt is the total number of points within the pointcloud that are associated with a location that is within a defined geometrical volume in which the location to which said point is associated is also within, and Nnew is the total number of points within the pointcloud that are i) associated with a location that is within the defined geometrical volume and ii) included in second set of points. In some embodiments, the defined geometrical volume has a center and the center of the defined geometrical volume is the location to which said point is associated. In some embodiments, the defined geometrical volume is a sphere. In some embodiments, adjusting the similarity score assigned to the first point, similarity_score, based on Nt and Nnew comprises: calculating P=Nnew/Nt; and calculating adjusted_similarity_score=(a)×(similarity_score), where a is a function of P. In some embodiments, a=a1 if P is greater than T, a=a2 if P is less than T, a1 is a first predetermined value, a2 is a second predetermined value, and T is a third predetermined value.

Step s708 comprises using the adjusted similarity scores to determine whether the area of interest has changed. In some embodiments, using the adjusted similarity scores to determine whether the area of interest has changed comprises determining that the area of interest has changed as a result of detecting a cluster of points that have an adjusted similarity score that is above a threshold.

Figure 8:
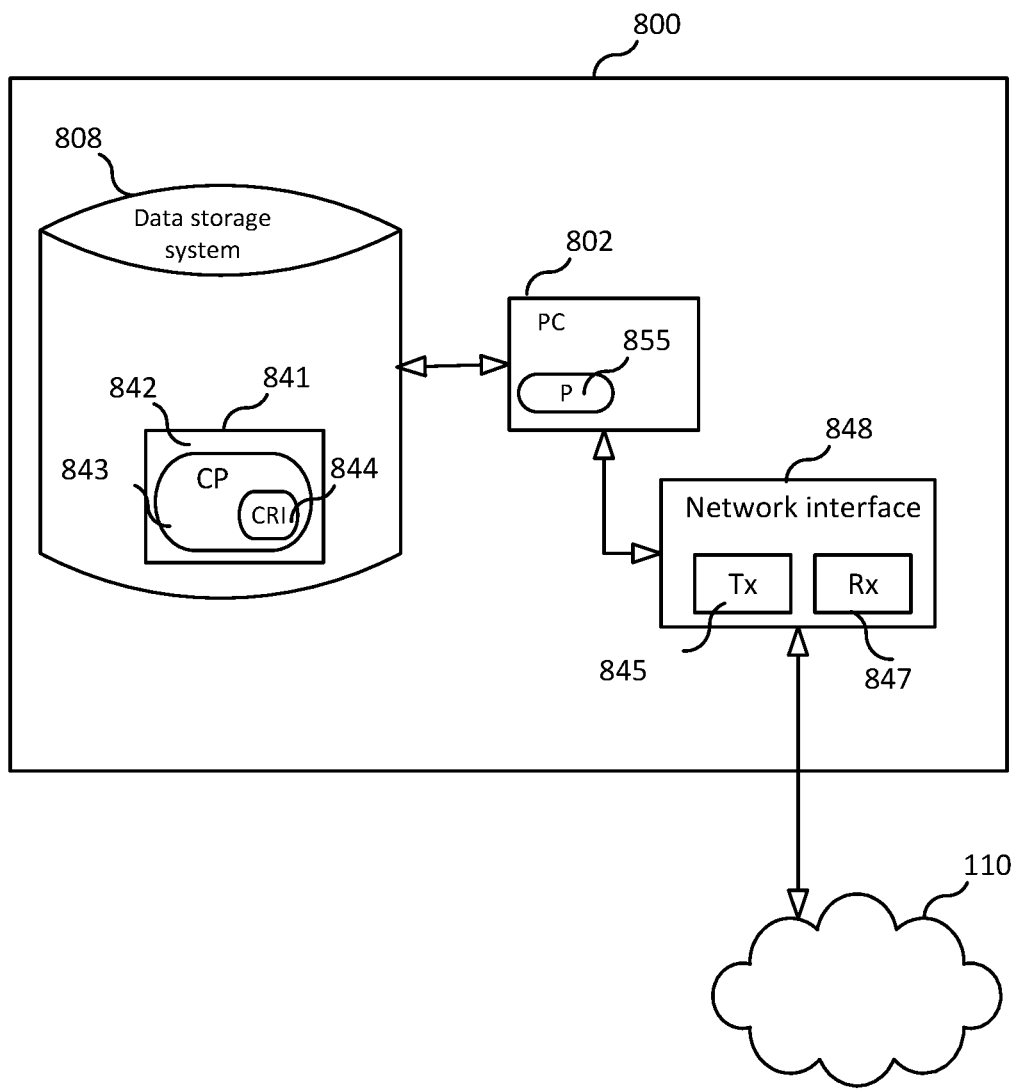
FIG. 8 is a block diagram of an apparatus for detecting a change in an AOI.

FIG. 8 is a block diagram of an apparatus 800, according to some embodiments, for performing the methods disclosed herein. As shown in FIG. 8, apparatus 800 may comprise: processing circuitry (PC) 802, which may include one or more processors (P) 855 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 800 may be a distributed computing apparatus); at least one network interface 848 comprising a transmitter (Tx) 845 and a receiver (Rx) 847 for enabling apparatus 800 to transmit data to and receive data from other nodes connected to a network 110 (e.g., an Internet Protocol (IP) network) to which network interface 848 is connected (directly or indirectly) (e.g., network interface 848 may be wirelessly connected to the network 110, in which case network interface 848 is connected to an antenna arrangement); and a storage unit (a.k.a., "data storage system") 808, which may include one or more non-volatile storage devices and/or one or more volatile storage devices. In embodiments where PC 802 includes a programmable processor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, magnetic media (e.g., a hard disk), optical media, memory devices (e.g., random access memory, flash memory), and the like. In some embodiments, the CRI 844 of computer program 843 is configured such that when executed by PC 802, the CRI causes apparatus 800 to perform steps described herein (e.g., steps described herein with reference to the flow charts). In other embodiments, apparatus 800 may be configured to perform steps described herein without the need for code. That is, for example, PC 802 may consist merely of one or more ASICs. Hence, the features of the embodiments described herein may be implemented in hardware and/or software. In other embodiments, CP 843 is contained in an electronic signal, an optical signal, a radio signal, or other carrier.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

REFERENCES

[1] Schonberger, Johannes Luts and Frahm, Jan-Michael, Structure-from-Motion Revisitied, Conference on Computer Vision and Pattern Recognition (CVPR), 2016.

[2] N. Gunji, H. Niigaki, K. Tsutsuguchi, T. Kurozumi and T. Kinebuchi, "3D object recognition from large-scale pointclouds with global descriptor and sliding window," in 23rd International Conference on Pattern Recognition (ICPR), Cancún, 2016.

[3] A. O. Ulusoy and J. L. Mundy, "Image-Based 4-D Reconstruction Using 3-D Change Detection," in Computer Vision—ECCV 2014, Zurich, 2014.

[4] K. Sakurada, T. Okatani and K. Deguchi, "Detecting Changes in 3D Structure of a Scene from Multi-view Images Captured by a Vehicle-Mounted Camera," in IEEE Conference on Computer Vision and Pattern Recognition, Portland, Oreg., 2013.

[5] D. Nister and H. Stew'enius. "Scalable Recognition with a Vocabulary Tree". In: Conference on Computer Vision and Pattern Recognition (CVPR). 2006.

[6] P. J. Besl and N. D. McKay. A method for registration of 3-D shapes. TPAMI, 14(2):239-256, 1992.

[7] N. Gelfand, N. J. Mitra, L. J. Guibas, and H. Pottmann. Robust global registration. In Symposium on Geometry Processing, volume 2, page 5, 2005.

[8] Straub, J., Campbell, T., How, J. P. and Fisher, J. W., 2017. Efficient global point cloud alignment using Bayesian nonparametric mixtures. In Proceedings of the IEEE Conference on Computer Vision and Pattern Recognition (pp. 2941-2950).

[9] Lowe, D. G., 2004. Distinctive image features from scale-invariant keypoints. International journal of computer vision, 60(2), pp. 91-110.

The invention claimed is:

1. A method for detecting a change in an area of interest, the method comprising:
   1) forming a pointcloud, the pointcloud comprising:
      a first set of points derived from a first set of one or more images, wherein each image included in the first set of images was obtained during a first period of time, t1, and each image included in the first set of images is an image of at least a portion of the area of interest; and
      a second set of points derived from a second set of one or more images, wherein each image included in the second set of images was obtained during a second period of time, t2, and each image included in the second set of images is an image of at least a portion of the area of interest, wherein each point of the pointcloud is associated with a location within the area of interest, and t1 is different than t2;
   2) for each point included in the pointcloud, assigning a similarity score to the point, wherein the similarity score assigned to the point indicates a degree of similarity between the point and points within the first set of points;
   3) for at least each point from the pointcloud that is included in a particular set of points:
      determining a value Nt and a value Nnew, wherein Nt is the total number of points within the pointcloud that are associated with a location that is within a defined geometrical volume in which the location to which said point is associated is also within, and Nnew is the total number of points within the pointcloud that are i) associated with a location that is within the defined geometrical volume and ii) included in second set of points; and
      adjusting the similarity score assigned to the point based on Nt and Nnew; and
   4) using (s708) the adjusted similarity scores to determine whether the area of interest has changed.

2. The method of claim 1, wherein t2 is after t1.

3. The method of claim 1, wherein t1 is after t2.

4. The method of claim 1, wherein adjusting the similarity score assigned to the first point, similarity_score, based on Nt and Nnew comprises:
   calculating adjusted_similarity_score=(a)×(similarity_score), wherein a is a function of Nnew/Nt.

5. The method of claim 4, wherein
   a=a1 if Nnew/Nt is greater than T,
   a=a2 if Nnew/Nt is not greater than T,
   a1 is a first predetermined constant,
   a2 is a second predetermined constant, and
   T is a predetermined constant.

6. The method of claim 1, wherein using the adjusted similarity scores to determine whether the area of interest has changed comprises:
   determining that the area of interest has changed as a result of detecting a cluster of points that have an adjusted similarity score that is above a threshold.

7. The method claim 1, wherein the defined geometrical volume has a center and the center of the defined geometrical volume is the location to which said point is associated.

8. The method of claim 7, wherein the defined geometrical volume is a sphere.

9. The method of claim 1, wherein the particular set of points consists of all of the points within the pointcloud that are assigned a similarity score that exceeds a threshold.

10. An apparatus for detecting a change in an area of interest, the apparatus comprising:
    processing circuitry; and
    a storage unit storing instructions for configuring the apparatus to:
    1) form a pointcloud, the pointcloud comprising:
       a first set of points derived from a first set of one or more images, wherein each image included in the first set of images was obtained during a first period of time, t1, and each image included in the first set of images is an image of at least a portion of the area of interest; and
       a second set of points derived from a second set of one or more images, wherein each image included in the second set of images was obtained during a second period of time, t2, and each image included in the second set of images is an image of at least a portion of the area of interest, wherein each point of the pointcloud is associated with a location within the area of interest, and t1 is different than t2;
    2) for each point included in the pointcloud, assign a similarity score to the point, wherein the similarity score assigned to the point indicates a degree of similarity between the point and points within the first set of points;
    3) for at least each point from the pointcloud that is included in a particular set of points
       determine a value Nt and a value Nnew, wherein Nt is the total number of points within the pointcloud that are associated with a location that is within a defined geometrical volume in which the location to which said point is associated is also within, and Nnew is the total number of points within the pointcloud that are i) associated with a location that is within the defined geometrical volume and ii) included in second set of points; and
       adjust the similarity score assigned to the point based on Nt and Nnew; and
    4) use the adjusted similarity scores to determine whether the area of interest has changed.

11. The apparatus of claim 10, wherein t2 is after t1.

12. The Apparatus of claim 10, wherein t1 is after t2.

13. The apparatus of claim 10, wherein adjusting the similarity score assigned to the first point, similarity_score, based on Nt and Nnew comprises:
    calculating adjusted_similarity_score=(a)×(similarity_score), wherein a is a function of Nnew/Nt.

14. The apparatus of claim 13, wherein
    a=a1 if Nnew/Nt is greater than T,
    a=a2 if Nnew/Nt is not greater than T,
    a1 is a first predetermined constant,
    a2 is a second predetermined constant, and
    T is a predetermined constant.

15. The apparatus of claim 10, wherein using the adjusted similarity scores to determine whether the area of interest has changed comprises:
    determining that the area of interest has changed as a result of detecting a cluster of points that have an adjusted similarity score that is above a threshold.

16. The apparatus of claim 10 wherein the defined geometrical volume has a center and the center of the defined geometrical volume is the location to which said point is associated.

17. The apparatus of claim 16, wherein the defined geometrical volume is a sphere.

18. The apparatus of claim 10, wherein the particular set of points consists of all of the points within the pointcloud that are assigned a similarity score that exceeds a threshold.

19. A non-transitory computer readable medium storing a computer program comprising instructions for configuration an apparatus to perform the method of claim 1.

\* \* \* \* \*